(12) United States Patent
Ouellette et al.

(10) Patent No.: US 6,281,649 B1
(45) Date of Patent: Aug. 28, 2001

(54) WINDSHIELD WIPER SYSTEM

(75) Inventors: Thomas J. Ouellette, Epping; William H. Prendergast, Salem, both of NH (US); William E. Ziegler, Reading, MA (US)

(73) Assignee: McCord Winn Textron Inc., Manchester, NH (US)

( * ) Notice: Subject to any disclaimer, the term of this patent is extended or adjusted under 35 U.S.C. 154(b) by 0 days.

(21) Appl. No.: 09/341,043

(22) PCT Filed: Dec. 30, 1997

(86) PCT No.: PCT/US97/23576

§ 371 Date: Jun. 30, 1999

§ 102(e) Date: Jun. 30, 1999

(87) PCT Pub. No.: WO98/29285

PCT Pub. Date: Jul. 9, 1998

Related U.S. Application Data

(60) Provisional application No. 60/034,217, filed on Jan. 3, 1997.

(51) Int. Cl.[7] .......................................... H02P 1/04
(52) U.S. Cl. ..................... 318/443; 318/DIG. 2; 15/250.12
(58) Field of Search ..................... 318/443, 444, 318/466, 480, 483, DIG. 2; 15/250.001, 250.12, 250.13

(56) References Cited

U.S. PATENT DOCUMENTS

| | | | |
|---|---|---|---|
| 4,123,817 | * 11/1978 | Hartery | 15/250.04 |
| 4,431,954 | * 2/1984 | Carperter et al. | 318/443 |
| 4,585,980 | * 4/1986 | Gille et al. | 318/444 |
| 4,665,488 | 5/1987 | Graham et al. . | |
| 4,670,695 | * 6/1987 | Licata et al. | 318/443 |
| 4,723,101 | * 2/1988 | Bauer et al. | 318/443 |
| 4,745,345 | 5/1988 | Petersen . | |
| 4,837,474 | 6/1989 | Petersen et al. . | |
| 4,900,995 | 2/1990 | Wainwright . | |
| 4,949,000 | 8/1990 | Petersen . | |
| 5,216,340 | 6/1993 | Welch . | |
| 5,241,248 | * 8/1993 | Forukoshi | 318/444 |
| 5,252,897 | 10/1993 | Porter et al. . | |
| 5,271,120 | 12/1993 | Eustache et al. . | |
| 5,291,109 | * 3/1994 | Peter | 318/443 |
| 5,355,061 | 10/1994 | Forhan . | |
| 5,404,085 | 4/1995 | Resch et al. . | |
| 5,561,882 | 10/1996 | Eustache et al. . | |
| 5,568,026 | 10/1996 | Welch . | |
| 5,569,217 | 10/1996 | Luther . | |
| 5,659,217 | 8/1997 | Petersen . | |
| 5,784,749 | * 7/1998 | Garbacik, Jr. et al. | 15/250.02 |
| 5,833,441 | * 11/1998 | Danish et al. | 417/423.14 |
| 5,874,796 | 2/1999 | Petersen . | |

FOREIGN PATENT DOCUMENTS

| | | |
|---|---|---|
| 1939453 | 2/1971 | (DE) . |
| 3208121 A1 | * 9/1983 | (DE) . |
| 3833579 | 4/1990 | (DE) . |
| 4337104 A1 | * 5/1994 | (DE) . |

* cited by examiner

*Primary Examiner*—Robert E. Nappi
*Assistant Examiner*—Rina I. Duda
(74) *Attorney, Agent, or Firm*—Reising, Ethington, Barnes, Kisselle, Learman & McCulloch, P.C.

(57) ABSTRACT

A dual motor windshield wiper system and windshield washer system integrated together into a single assembly. The system includes two motors (22, 22'), a control circuit (12), a fluid reservoir (120), a pump (112), and at least one mounting member (108, 108') that supports said motors. The reservoir can be located between the two motors and can be supported in place by the motors. The motors can be thermally coupled to the reservoir so that fluid within the reservoir acts as a heat sink for the motors. The positions of the wipers can be controlled to follow targeted positions that are determined in accordance with acceleration, velocity, and deceleration values that are calculated using a wiper speed setting selected by the vehicle driver.

27 Claims, 9 Drawing Sheets

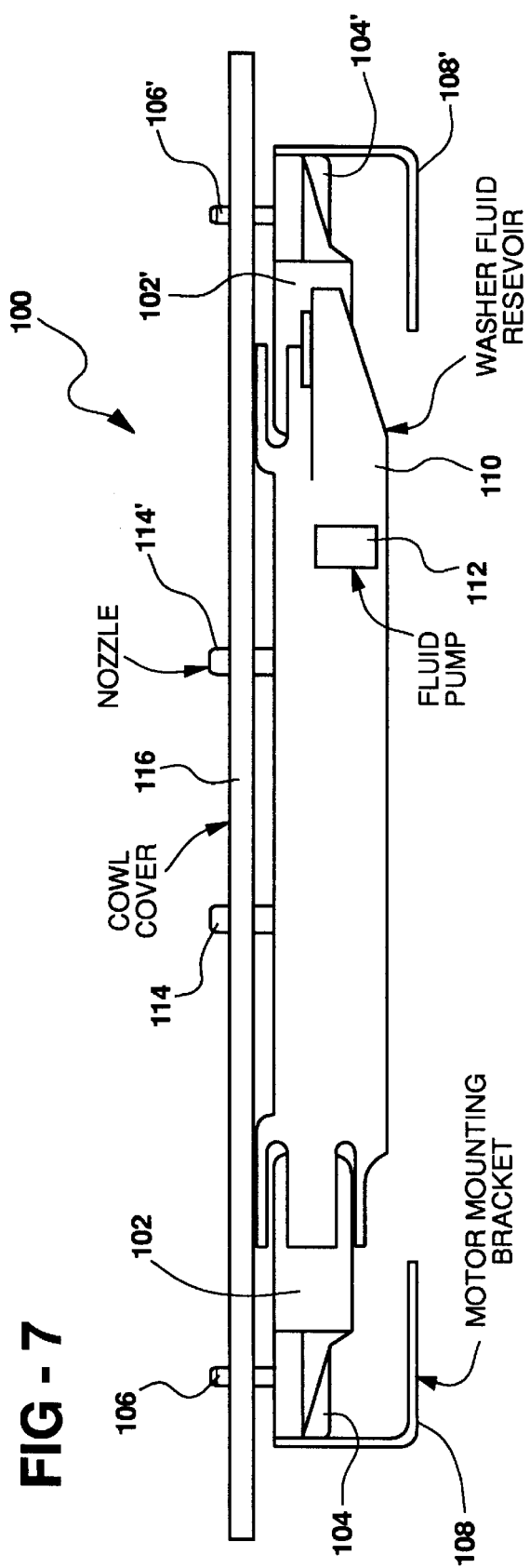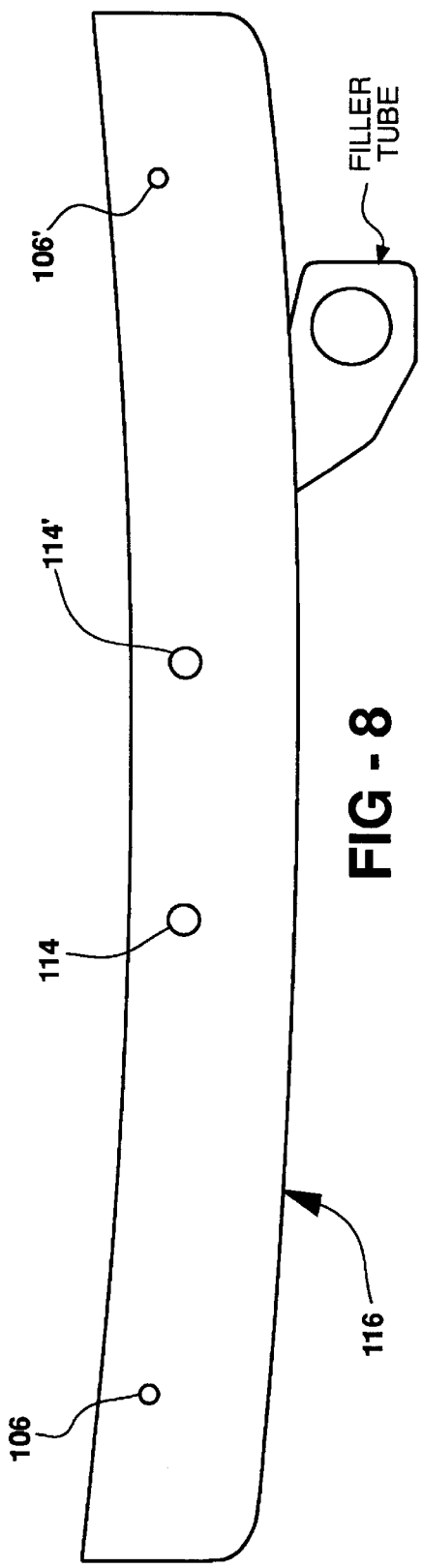

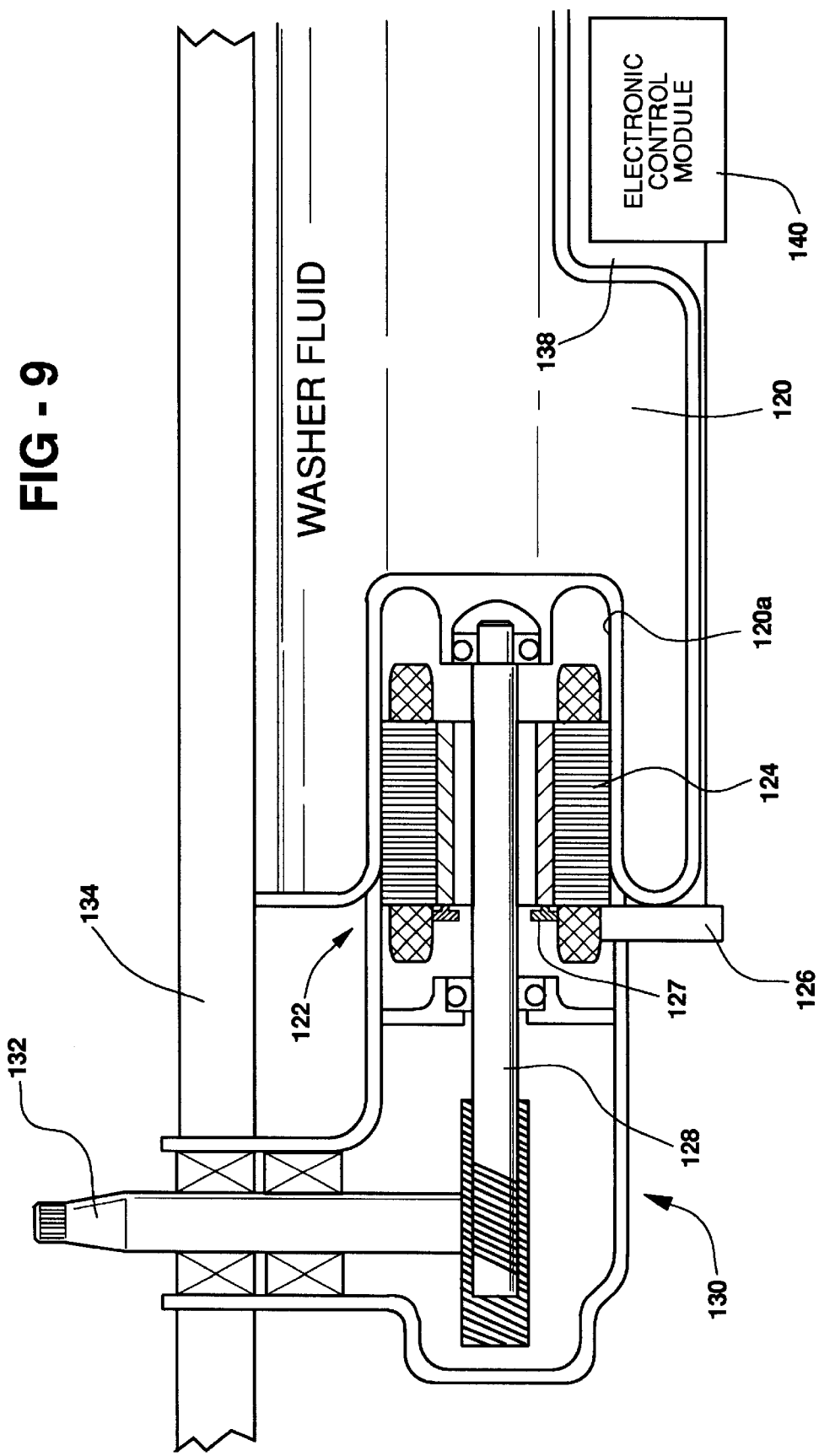

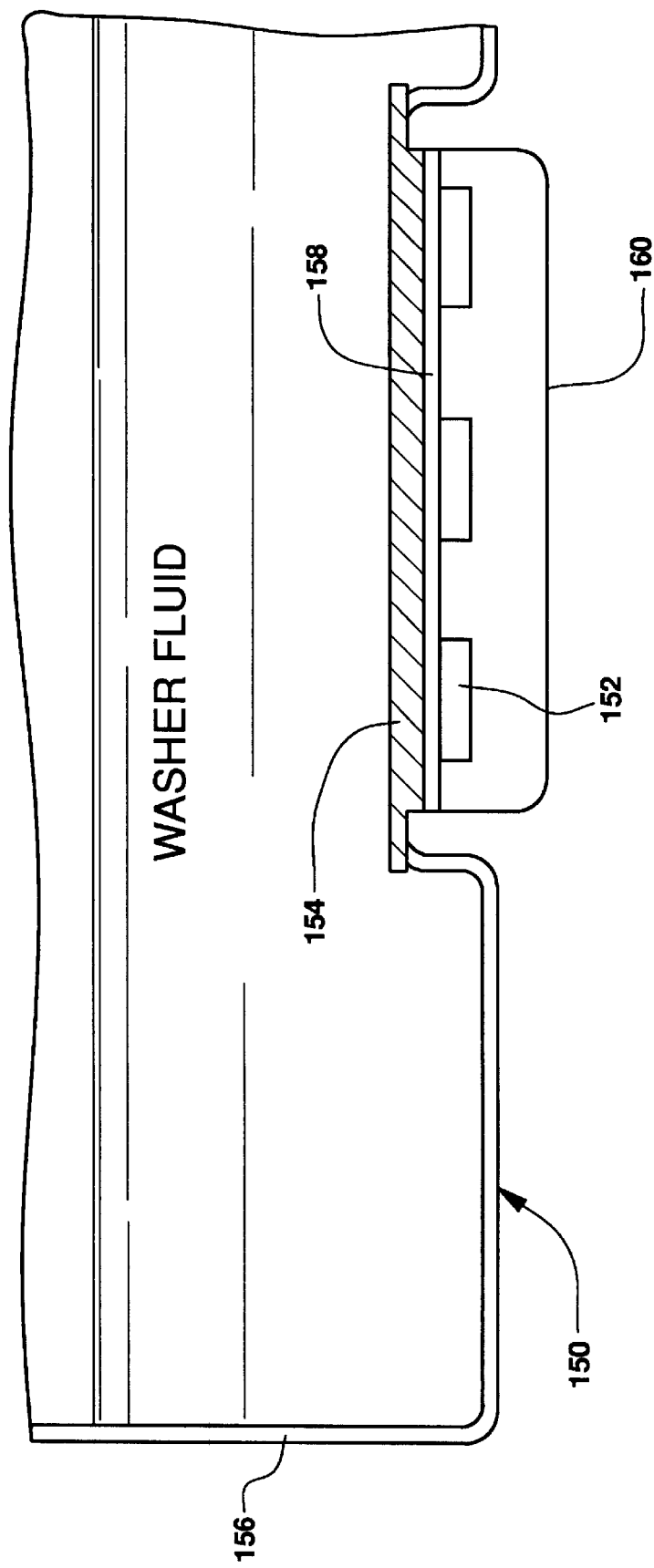

WINDSHIELD WIPER SYSTEM

This Application claims Beneficial of Provisional application Ser. No. 60/034,269 filed Jan. 3, 1997.

This application claims benefit of Provisional Application No. 60/034,217, filed Jan. 3, 1997, and entitled "WINDSHIELD WIPER SYSTEM".

TECHNICAL FIELD

The present invention relates generally to windshield wiper systems and, more particularly, to automotive windshield wiper system that utilize individual brushless dc motors for coordinated, but mechanically independent control of the windshield wipers.

BACKGROUND OF THE INVENTION

Automotive windshield wiper systems typically use a pair of motor driven wiper blades to clean the windshield. In most systems, a single motor is used with a mechanical linkage between the wiper blades so that the single motor provides simultaneous, synchronous reciprocation of the two wiper blades. Automotive vehicles also typically include a windshield washer system that sprays washer fluid onto the windshield to aid in the cleaning of the windshield by the wipers. The washer system can include a washer fluid reservoir to store the washer fluid, a pair of nozzles to spray the fluid onto the windshield, and a pump to supply the washer fluid to the nozzles. While these washer systems are commonly located in the engine compartment near the windshield wiper system itself, integration of the washer system and the windshield wiper system into a compact assembly can be difficult because of the moving mechanical linkages used to drive both wipers from a single motor.

Windshield wiper systems have been designed that utilize separate electric motors for each of the wipers. See, e.g., U.S. Pat. No. 4,585,980 to Gille et al., U.S. Pat. No. 4,665,488 to Graham et al., U.S. Pat. No. 4,900,995 To Wainwright, and U.S. Pat. No. 5,252,897 to Porter et al. While eliminating the mechanical linkage between the wipers, these dual motor system have at times been disfavored because operation of the two motors must be properly coordinated to prevent collisions between the two wipers. Coordination of the motors has been accomplished using position feedback by sensing, for example, the position of each motor's armature or by using position sensors on the wiper levels or the windshield itself, as in U.S. Pat. No. 5,157, 314 to Kühbauch.

In the field of motor controllers generally, motor position feedback has been used in brushless dc motors for commutation of the motor windings. This has sometimes been done using Hall Effect sensors, as in U.S. Pat. No. 4,680,515 to Crook, U.S. Pat. No. 4,723,100 to Horikawa et al., and U.S. Pat. No. 4,897,583 to Rees. The output of these Hall Effect sensors have also been used along with a clock oscillator to produce position and tachometer signals for operational control of the motor. See, for example, U.S. Pat. No. 4,415,844 to Mendenhall et al. and U.S. Pat. No. 4,717,864 to Fultz.

While suitable for use in windshield wiper systems, the use of the above-noted brushless dc motor controllers in a windshield wiper system that uses separate position sensors for coordination of the wipers can result in an unnecessarily complicated design.

SUMMARY OF THE INVENTION

In accordance with the present invention, there is provided a dual motor windshield wiper system that includes a windshield washing system all integrated into a single drop-in assembly. The assembly can include both wiper motors, a windshield washer fluid reservoir, a washer fluid pump, and at least one mounting member that supports the motors, fluid reservoir, and pump and that is adapted to attach the assembly to the vehicle.

In accordance with another aspect of the invention, the fluid reservoir can be located between the motors in the area that is typically used for the mechanical linkages required for a single motor system. The motors can be attached to separate mounting members and together can support the fluid reservoir between them. Alternatively, the reservoir can be attached to the one ore more mounting members and can provide the necessary support for the motors. The reservoir can have recesses in its outer surface that can be used as the motors' housings. The motors can be thermally coupled to the interior of the reservoir so that washer fluid within the reservoir operates as a heat sink to remove heat from the motors. Similarly, one or more power devices used by the windshield wiper system's control circuit can be thermally coupled to the interior of the reservoir to sink heat produced by the devices during use.

In accordance with another aspect of the invention, there is provided a dual motor windshield wiper system in which encoders are used to provide pulses indicative of angular displacements of the motors, with the pulses being used not only for commutation of the motors, but also for tracking the position of the wipers. This reduces the complexity of the control circuitry by using a single encoder for both commutation and position tracking.

In accordance with another aspect of the invention, the windshield wiper system includes a control circuit that is operable to automatically determine a park or home positions without the use of limit switches. This can be accomplished by rotating the wipers towards their home position until further rotation is obstructed by the cowl cover or some other part of the vehicle. The wipers can then be rotated upward by a small amount with current position of the wipers then being used as reference for determining the absolute position of the wipers during normal operation.

In accordance with another aspect of the invention, the control circuit can provide control of each wiper's position by comparing the actual position to target position values that are generated using acceleration, velocity, and deceleration values determined in accordance with the wiper speed selected by the vehicle operator.

In accordance with another aspect of the invention, the control circuit is operable to measure the current used by the motors and, using the measured current, is operable to determine an environmental condition of the windshield (e.g., wet, dry, icy). Outside air temperature and other sensed parameters can also be used along with motor current to determine the environmental condition of the windshield.

In accordance with yet another aspect of the invention, there is provided a windshield washer system having a control circuit operable to control the spray of washer fluid onto the windshield in accordance with at least one measured parameter. This parameter can be, for example, vehicle speed, so that overspray of the washer fluid can be avoided at higher speeds.

In accordance with another aspect of the invention, there is provided a windshield wiper system which includes a user-selectable intermittent mode of operation, wherein the control circuit is operable pause the motors each time the wipers reach either of their ends of their travel. For a windshield wiper system in which the wipers sweep up from the bottom center of the windshield to opposite sides of the windshield, this system is advantageous since the wipers do not obscure the driver's view in either their inboard or outboard position and can therefore be paused at each end of travel rather than only at the end of a complete cycle.

BRIEF DESCRIPTION OF THE DRAWINGS

FIG. 7 is a side view of one embodiment of a mechanical assembly for a windshield wiper system of the present invention;

FIG. 8 is a top view of the mechanical assembly of FIG. 7.;

FIG. 9 is a side view of another embodiment of a mechanical assembly showing an integral washer fluid reservoir and motor housing; and FIG. 10 is a side view of another embodiment of a mechanical assembly showing a heat sink that forms one wall of the washer fluid reservoir.

DESCRIPTION OF THE PREFERRED EMBODIMENT

The following description of the illustrated embodiment is separated into two sections, the first being directed to the electrical and control aspects of the illustrated embodiment and the second being directed to the mechanical and assembly aspects of the illustrated embodiment.

WINDSHIELD WIPER ELECTRONIC CONTROL SYSTEM

Figure 1:
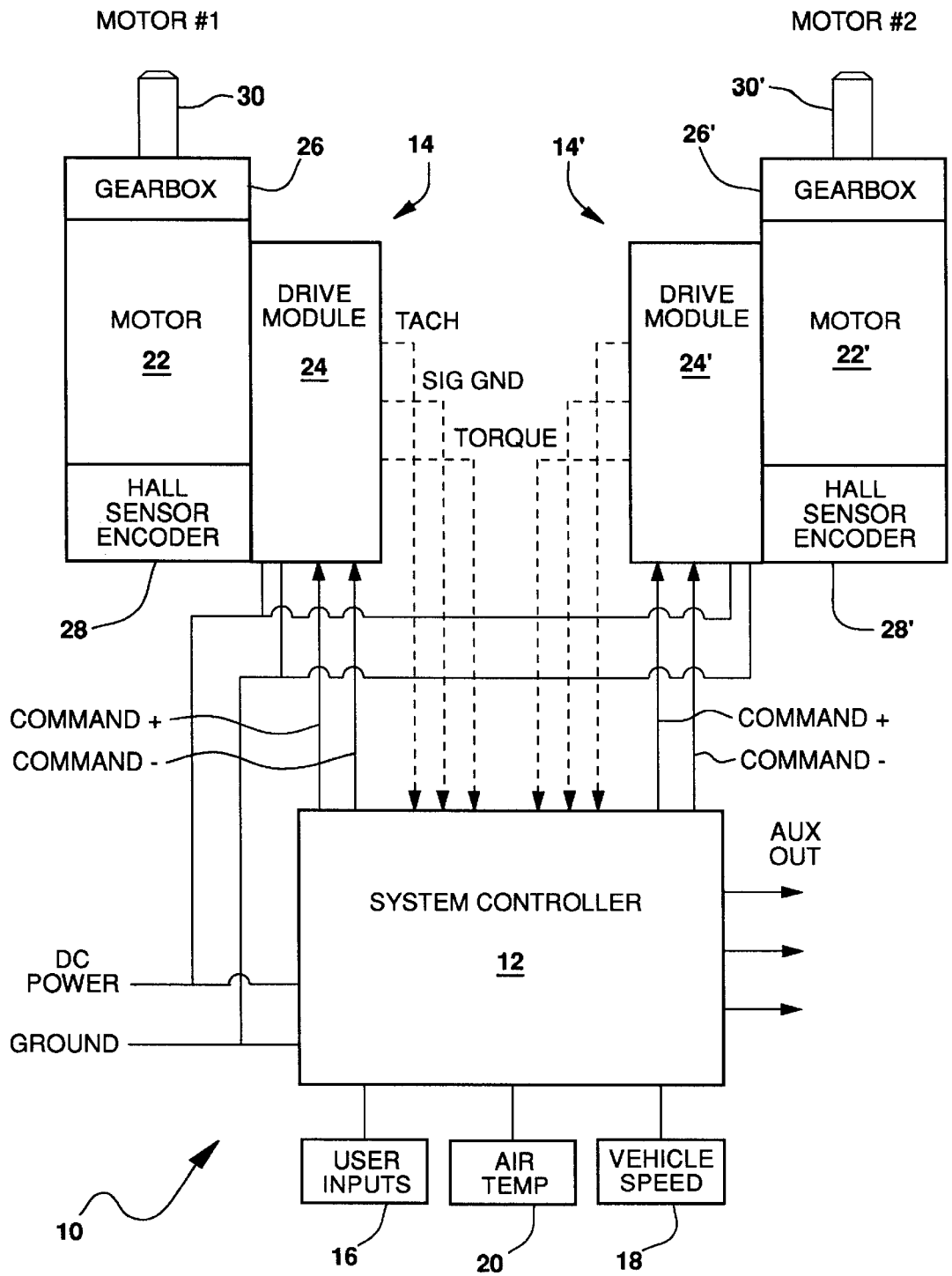
FIG. 1 is a block diagram of a preferred embodiment of an electronic control circuit for a windshield wiper system of the present invention.

As shown in FIG. 1, an electronic control system designated generally as 10 includes a system controller 12 that drives a pair of electric motors 14, 14'. Controller 12 operates motors 14, 14' in accordance with various commanded inputs, operational parameters, and environmental conditions. The commanded inputs include one or more user inputs 16 such as a windshield wiper switch that is used by the vehicle driver to activate the windshield wipers and to set the speed and, in the case of interval wipers, to specify the intermittent mode and the delay between wiping cycles. Operational parameters include the torque and position of each of the motors, and can also include vehicle speed obtained from a digital tachometer of other vehicle speed sensor 18. As discussed in greater detail below, these parameters are used by controller 12 for various purposes, including determination and adjustment of the position of the wiper blades, overcurrent protection for the motors, and determination of the condition of the windshield (e.g., dry, wet, ice-covered). Environmental conditions include air temperature which can be obtained via a thermistor or other conventional air temperature sensor 20. As will also be discussed below, the measured air temperature can be used along with the motor torque and vehicle speed to determine the condition of the windshield.

Motors 14 and 14' each include a brushless dc motor 22, 22', a drive module 24, 24', and a gear box 26, 26', respectively, DC motors 22 and 22' each include respective encoders 28, 28' that are used by drive modules 24, 24' to provide electronic commutation of the motor windings in a conventional manner. Gear boxes 26 and 26' have respective output shafts 30, 30' that are connected directly to their associated wiper blades (not shown). The construction and operation of motors 14 and 14' are the same—only their commanded movements are different. Therefore, except where otherwise indicated, the following discussion will be directed only to motor 14 and its use in connection with controller 12 and it will be understood that the discussion applies equally to motor 14'.

Drive module 24 receives commands from controller 12 in the form of differential drive COMMAND+ and COMMAND-signals and operates motor 22 in the commanded direction and at the commanded speed. Drive module 24 provides controller 12 with feedback information that is used by controller 12 in various ways, including control of the wiper blade position and monitoring for an overcurrent condition. This feedback information includes a tachometer signal and a torque signal. A signal ground is also provided as a reference for the tachometer and torque signals.

The tachometer signal is a pulse train having a pulse repetition rate, or frequency, that is indicative of the motor speed. This signal is generated by drive module 24 using the position signals that encoder 28 provides for use in commutation of the motor windings. In the illustrated embodiment, encoder 28 utilized three Hall effect sensors to provide the position pulses. Controller 12 uses this tachometer signal to track the position of the wiper blades. More specifically, since each successive pulse of the tachometer signal represents a particular angular displacement, the position of the wiper blade can be determined as a function of the number of pulses that have occurred since the wiper blade has moved from one of its ends of travel. This permits controller 12 to know the instantaneous position of the wiper blades at any time. In the illustrated embodiment, encoder 28 utilizes three Hall effect sensors to provide the position pulses that are used to generate the tachometer signal. As will be appreciated by those skilled in the art, optical and other types of encoders could be used instead of Hall effect sensors to provide the signals used for both commutation of the motor winding and tracking of the blade position.

The torque signal is actually a measure of the motor current that can be converted to a torque value by controller 12. As is known, measurement of the motor current can be accomplished using a current sensor in series with the motor's ground connection. The current sensor can be a small valued wirewound resistor or other resistance having a small temperature coefficient. The motor current is converted to a torque value using the torque constant associated with motor 14. The torque constant is stored within the memory of controller 12 and accessed as needed. The resulting torque signal is used to protect motor 22 against an overcurrent condition and is used in conjunction with other inputs to determine the condition of the windshield.

Figure 1A:
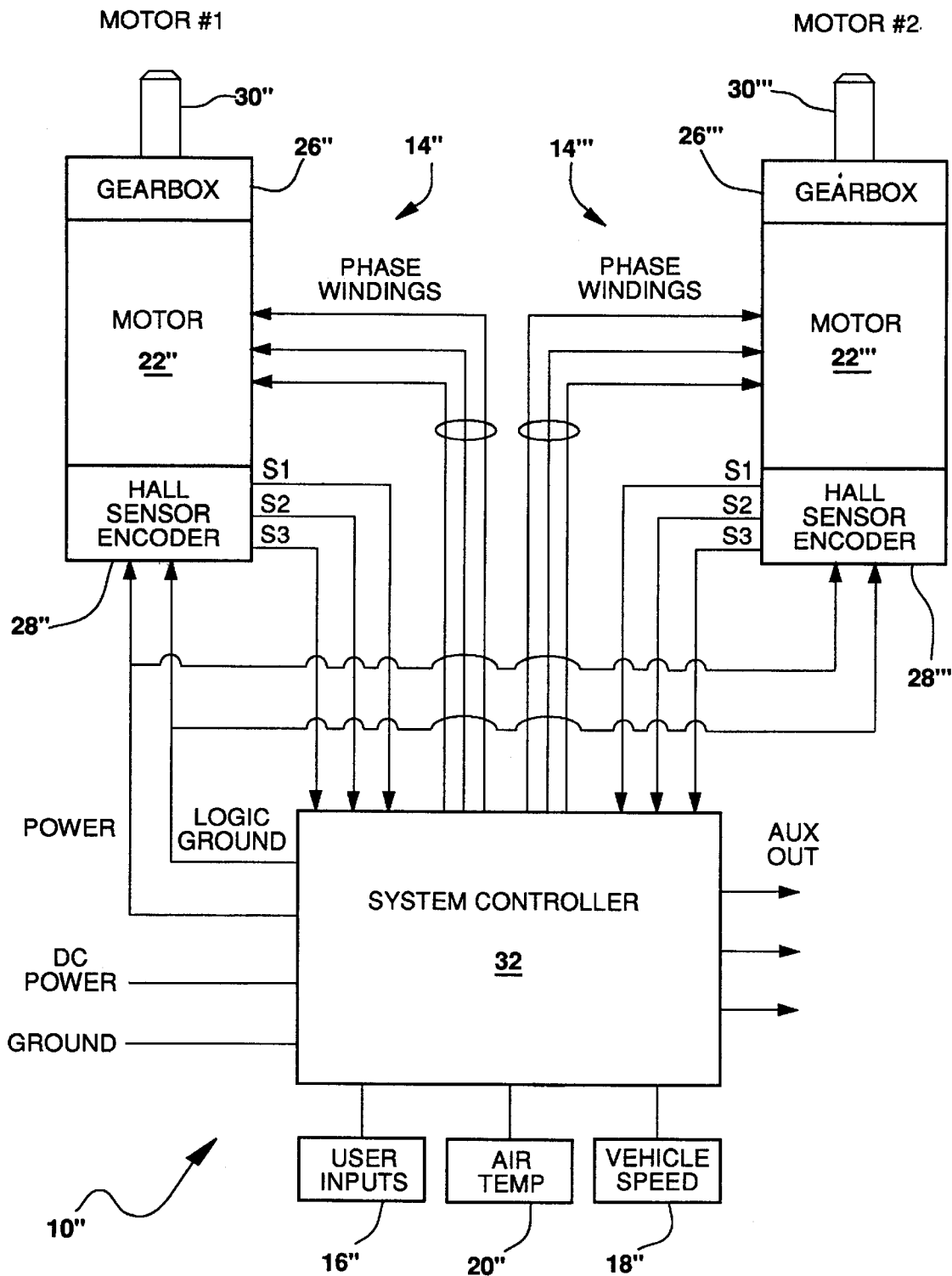
FIG. 1A is a block diagram of another preferred embodiment of an electronic control circuit.

Another embodiment of the electronic control circuit is shown in FIG. 1A. In this figure, all of the components except system controller 32 are the same as that shown in the embodiment of FIG. 1 and therefore have been labelled used double primes (") where unprimed numerals were used in FIG. 1 and using tripe primes ("') where primed numberals were used. The embodiment of FIG. 1A differs from that of FIG. 1 in that the functionality of drive modules 24 and 24' of FIG. 1 have been incorporated into controller 32. Thus, the three Hall effect sensor outputs from each of the encoders are provided to controller 32 and controller 32 generates the necessary phased drive signals for the motor windings of each motor.

Figure 2:
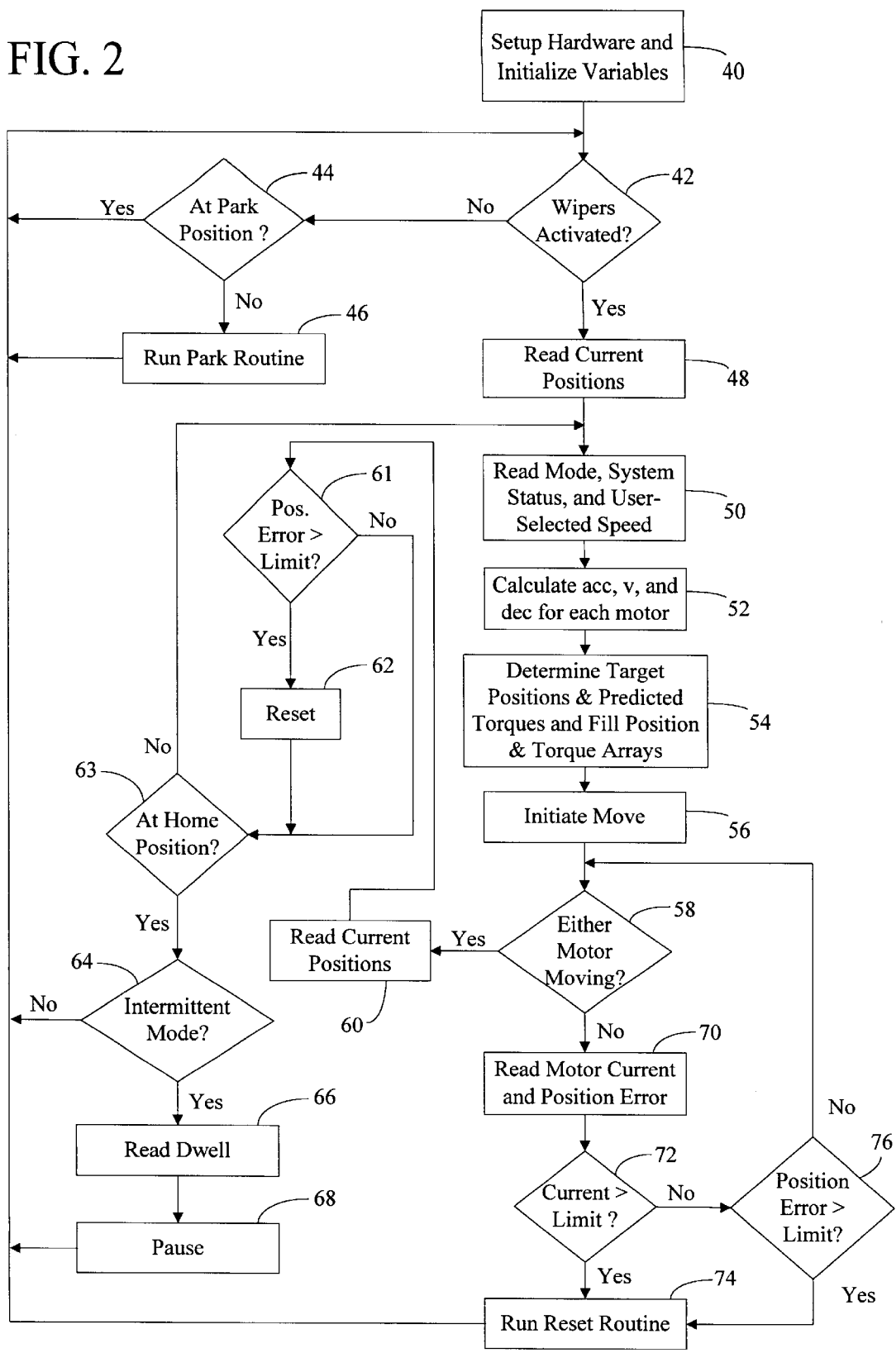
FIG. 2 is a flow chart depicting the operation of the windshield wiper system of FIG. 1.

Turning now to FIG. 2, the method utilized by controller 12 to operate motors 14 and 14' will now be described. In the following description, reference numerals enclosed within angled brackets <> denote the numbered steps within the figures. Upon start-up <40>, controller 12 performs any needed setup tasks, such as configuring the hardware (e.g., setup of the controllers's I/O ports) and initializing the variables used by controller 12. Then, a check is made <42> to determine if the user has activated the wipers via the windshield wiper switch 16.

If the windshield wipers have not been activated, then the controller checks the current position of the wipers to determine if they are located at the "park" position <44>. The park position is the location at which the wipers are stored when the windshield wiper system is not activated. If desired, the part position can be the same as the "home" position which is one of the end points of travel of the wiper blade during a normal operating cycle. As mentioned above, the position of each wiper blade is tracked using the tachometer signal pulses. More specifically, a register or counter variable for each wiper can be initialized to zero when the wipers are in their part position. Then, for each wiper, the counter is incremented by one for each tachometer signal pulse occurring as a result of the motor being operated in one (e.g., clockwise) direction and is decremented by one for each pulse occurring as a result of the motor being operated in the other (e.g., counter-clockwise) direction. In the illustrated embodiment, this tracking is provided by controller 12. If the wipers are both in their park positions <44>, then the process loops back to block <42 > and this loop repeats until the user activates the windshield wipers vis user input 16. If, at block <44>, one or both of the wipers are not in their respective park positions, then a part routine <46> is run that moves both wipers to their park positions. Thereafter, the process returns to block <42> to again for user-activation of the wiper system.

If, at block <42>, the user has switched on the windshield wipers, then controller 12 begins a normal wiping cycle. The first step in this cycle is to determine the current positions of the wiper blades <48>; for example, by checking the current value of the tachometer pulse counters. Then, the wiping mode, system status, and user-selected speed are read <50>. The wiping mode is specified by the user and indicates whether the wipers are to operate in the intermittent or continuous mode. As will be appreciated, other wiping modes are possible and the system is not limited to the types of synchronized movement provided by mechanically linked systems. For example, in another mode, the wiper speeds may automatically change from a user-selected setting based upon any of the sensed vehicle operating and/or environmental parameters. The system status information is used by controller 12 to verify that the control system is ready to operate motors 14, 14'. The status information can include any desired relevant information to indicate, for example, that the motor windings are not somehow shorted or that operating power for the motor is present. The user-selected speed specifies how quickly the wipers are to move through their range of travel. As with the wiping mode, the selected speed can be inputted by a user via input device 16.

Once the user-selected speed has been obtained, acceleration (acc), velocity (v), and deceleration (dec) values can be determined <52> for each motor using equations [5]–[7] that are discussed farther below in connection with FIG. 4. These values are used by controller 12 to determine the target positions and predicted torque values at discrete points in time during the wiping cycle <54>. These position and torque values can be stored in arrays and accessed as needed for comparison to actual positions and torques.

The next step <56> is to activate motors 14 and 14' to begin wiper movement using a position servo loop that operates to minimize the error between the actual and target values of the wiper position. Once the motors are energized, the tachometer signal is examined to determine whether either of the motors are moving <58>. If so, the current position is read <60> and compared to the appropriate target position from the position array to determine the position error. The position error is then checked <61> to determine if it exceeds a preselected limit. If neither of the wipers are too far out of position, then a check is made to determine if the wipers are at the home position <62>. If either wiper is out of position, then a reset routine is performed <62> prior to moving to block <63>. The reset routine involves stopping both motors, then activating one to move its associated wiper blade to its end of travel and then activating the other motor to move its associated wiper blade to its end of travel (i.e., at the end of a wiping cycle). If at block <63> the wipers are not in the home position, the process loops back to perform another iteration of the main loop, starting with reading of the mode, system status, and user-selected speed settings. Once the wipers reach the home position <63>, a check is made to determine if the wipers have been set to the intermittent mode <64>. If not, the process returns to block <42> to check whether the wipers have remained activated or have been turned off. If the wipers have been set to the intermittent mode, then the dwell time selected by the user is read <66> and the wipers are then paused <68> for a corresponding amount of time. The process then returns to block <42>.

If, a block <58>, neither of the motors are moving, then an error condition is assumed and the values of current and position error of both of the motors are read <70>. If the magnitude of the motor current is greater than a preset limit <72>, then a reset routine is performed <74>. This reset routine is the same as that performed at block <62>, except that after the routine is finished, the process returns to block <42> to restart its normal wiping cycle. If, at block <72>, the motor current was within the predefined limits, then the magnitude of the position error is checked to determine if it is above a predefined limit <76>. If not, the process returns to block <58> and will loop through blocks <70>, <72>, and <76> until at least one of the motors starts moving or the motor current or position error exceeds their respective limits. If, at block <76>, the position error exceeds its limit, then the reset routine is run <74>.

By utilizing the reset routine whenever the position error exceeds a predefined limit, the system can avoid collisions between the wipers that might otherwise occur if one or both wipers become too far out of a desired position. Similarly, by utilizing the reset routine whenever the motor current error exceeds a predefined limit, the system can prevent an overcurrent condition that could otherwise damage either the motors or some other electrical or mechanical component of the system.

Figure 3:
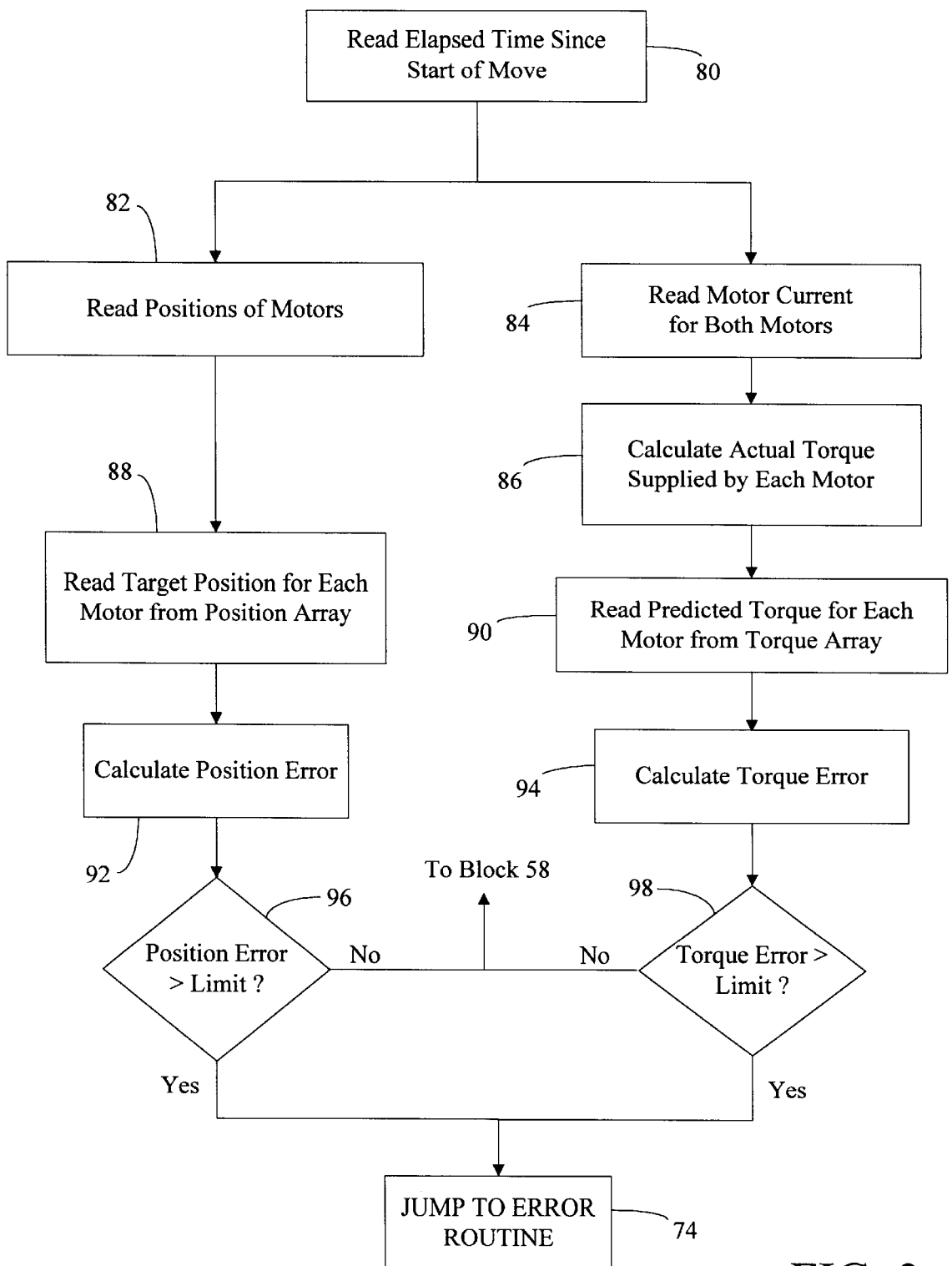
FIG. 3 is a flow chart depicting a selected portion of the flow chart of FIG. 2 in greater detail.

The process of blocks <70–76> that check for position and torque error are shown more fully in FIG. 3. As discussed above, the target positions of the wiper blades at each of a number of time intervals spanning a single cycle can be stored in an array. Predicted torque values corresponding to each time interval could also be stored as an array. The sizes of these arrays are fixed and the length of the time intervals depends upon the user-selected cycle time (e.g., fast or slow wiper speed). As will be appreciated, by tracking the amount of elapsed time since the beginning of a cycle, the current interval can be determined at any time using the known total cycle time and known number of intervals. Once the current interval is determined, the expected position and torque can simply be looked up within their respective arrays.

Thus, the first step in checking the position and motor current error is to determine how much time has elapsed since the beginning of the current wiping cycle <80>. Then, the actual motor positions are read <82>, as well as the motor currents <84>. The motor current is then converted into a torque value <86> using the torque constant for the motor. Based on the elapsed time, the current time interval is determined and the position and torque arrays are accessed <88, 90> to determine the target position and predicted torque values. The position error is then calculated <92> based upon the difference between the actual and target positions. Similarly, the torque error is calculated <94> based upon the difference between the actual and predicted torque values. For each motor, these errors are compared to preselected limits <96, 98> and the reset routine is run <74> if either error is beyond the prescribed limits. Otherwise, the process returns to block <58> of FIG. 2.

Controller 12 and drive module 24 together provide the position servo loop, with controller 12 generating the COMMAND signal based upon the difference between the measured position and a target position. As discussed above, the tachometer signal feedback is used to determine the current position of the wiper. The target position is determined using the predetermined acceleration, velocity, and deceleration values calculated at block 52 of FIG. 2. Referring now to FIG. 4, the derivation and use of those equations will now be discussed. As shown in that figure, one half of a single wiper cycle involves an initial period $0<t<t_1$ of constant acceleration from rest, followed by a constant velocity period $t_1<t<t_2$, followed by a final period $t_2<t<T$ of constant deceleration back to rest. Given that the wiper must traverse a distance D in an amount of time T, the value of the maximum velocity v and the transition points $t_1$ and $t_2$ are selected so as to minimize the acceleration and deceleration values while still covering the distance D in the allotted time T and while maintaining the desired positional synchronism between the two wiper blades. Although FIG. 4 depicts only one half of a full wiper cycle, it will be appreciated that the return half of the cycle can simply be the reverse of the first half (i.e., $acc_r=dec_f$, $dec_r=acc_f$, and $v_r=v_f$, where subscript f indicates the forward rotation used during the first half of the cycle and subscript r indicates the reverse rotation used during the second half of the cycle).

The derivation of the equations used for calculating the acceleration, velocity, and deceleration values will now be described in connection with FIG. 4 for a single wiper. The distance covered during acceleration is defined by the equation:

$$D_1 = \left(\frac{v}{2}\right)(t_1). \quad [1]$$

The distance covered during constant velocity is defined by the equation:

$$D_2 = (v)(t_2 - t_1). \quad [2]$$

The distance covered during deceleration is defined by the equation:

$$D_3 = \left(\frac{v}{2}\right)(T - t_2) \quad [3]$$

Therefore, $$D=D_1+D_2+D_3 \quad [4]$$

Substituting equations [1], [2], and [3] into equation [4] and solving for the velocity v yields:

$$v = \frac{2D}{T(1 - a + b)} \quad [5]$$

where $t_1=aT$ and $t_2=bT$.

The acceleration during the first interval equals the slope of the line in that interval. Therefore, $$acc = \frac{v}{t_1},$$

which by substituting in equation [5] for the velocity yields:

$$acc = \frac{2D}{(T^2)(a)(1 - a + b)} \quad [6]$$

Similarly, the deceleration during the last interval can be calculated as follows:

$$dec = \frac{2D}{(T^2)(1 - b)(1 - a + b)} \quad [7]$$

Figure 4:
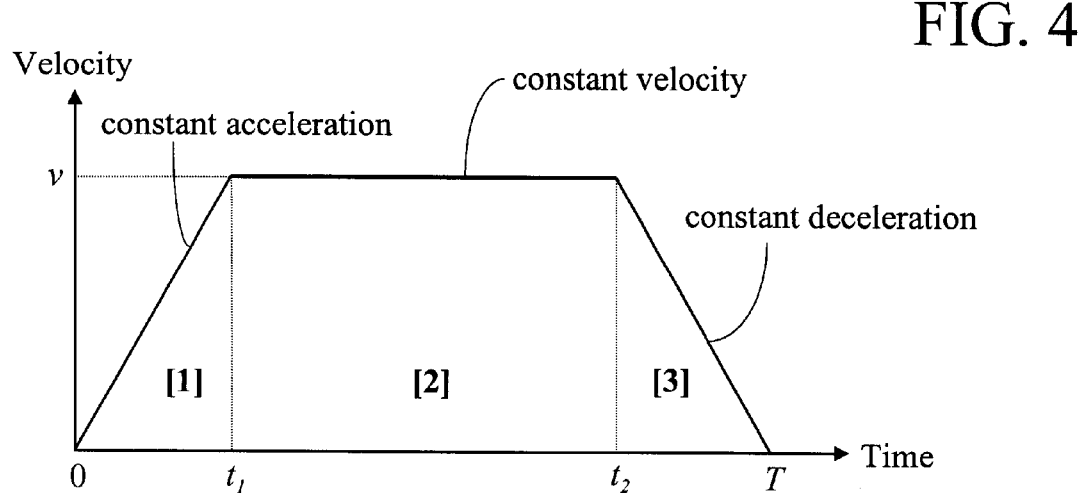
FIG. 4 is a graph showing the velocity of a wiper blade as a function of time and is provided for the purpose of deriving the velocity, acceleration, and deceleration values utilized in the system operation of FIGS. 2 and 3.

As will be understood by inspection of FIG. 4, the instantaneous target position at any point t in time is equal to the area under the curve over the interval 0 to t and can be determined using one or more of the acceleration, velocity, and deceleration values. As indicated by equations [5], [6], and [7], the acceleration, velocity, and deceleration values can be determined as a function of parameters a and b (i.e., as a function of the transition points $t_1$ and $t_2$).

The velocity curve and equations shown in FIG. 4 are for only one of the two wiper blades. It will be appreciated that the same equations can be used for the other wiper blade, and that for coordinated movement, the traversal time T will remain the same while the distance D to be covered may be different. Also, the values of parameters a and b that define the acceleration transition points may be different. For a two wiper system, the parameters a and b for each of the two wipers can be determined empirically as follows. First, the ranges of travel for each of the two wiper blades is separated into a number of intervals (e.g., ten), each of which corresponds to an incremental point in time during half of the wiping cycle. The wipers are then both manually set at the respective positions that they would desirably occupy after the first interval of time (e.g., at time T/10) and these positions are recorded. As mentioned above, these positions are represented by counters that are incremented (or decremented depending upon the direction of rotation) using the tachometer signal. Then, the two wiper blades are moved to the positions that they would desirably occupy after the second interval of time. These positions are saved in the next position of its associated array and the process is repeated for each of the remaining intervals. Using these desired positions, the values of a and b for each of the wipers are then determined either by trail and error or by a suitable curve-fitting algorithm. In selecting values for a and b, it is preferable to minimize the acceleration and deceleration levels as much as possible within the constraints of maintaining the required positional coordination between the two wipers.

Figure 5:
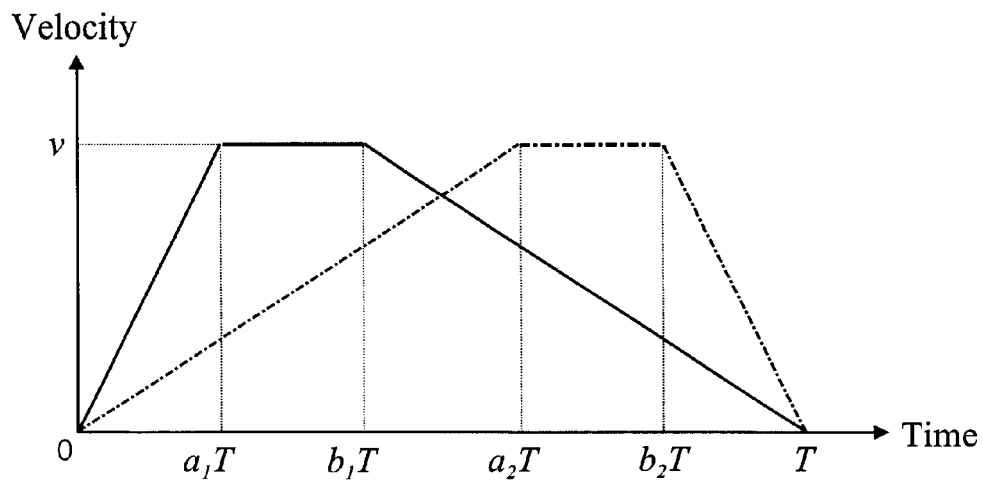
FIG. 5 depicts velocity curves representing the velocity of each of two wipers of the windshield wiper system of FIG. 1.

FIG. 5 provides an exemplary set of velocity curves for each of two wipers in a wiper system designed to rotate the two wipers in opposite directions. The wipers initially start at a lower, central portion of the windshield and are rotated up and away from each other towards the opposite sides of the windshield. As will be appreciated, the values of $a_1$ and $b_1$ for the first wiper and $a_2$ and $b_2$ for the second wiper are selected so that the first wiper accelerates faster than the second, but for a shorter amount of time. Since the wipers are positioned relatively close to each other when in the park and home positions, this differential in acceleration results in the first wiper moving up and away from the park and home positions faster than the second wiper, thereby helping to avoid any contact between the two.

Figure 6:
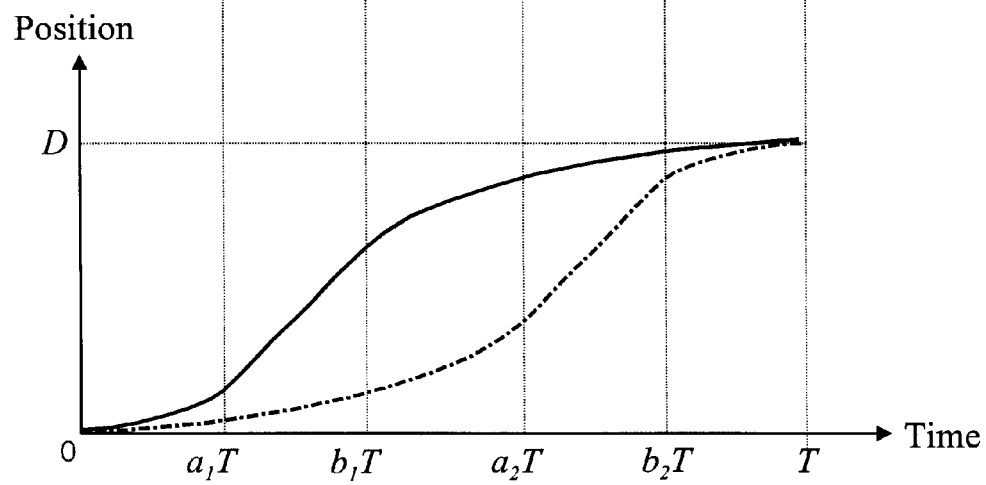
FIG. 6 depicts position curves representing the positions of the two wipers resulting from their operation according to the velocity curves of FIG. 5.

FIG. 6 shows the position of the two wiper blades as a function of time, using the velocity curves of FIG. 5. FIG. 6 illustrates the growing separation of the two wiper blades resulting from the differing accelerations of the wipers from their park positions. FIG. 6 also illustrates the manner in which the values of a and b can be determined for each wiper. The desired positions of the wiper blades at each interval can be plotted and the values of a and b determined by inspection of the resulting plot.

Once the values of parameters a and b have been determined for each of the wipers, controller 12 is programmed with these values and can thereafter generate the acceleration, deceleration, and velocity values using the user-selected speed setting. Thereafter, controller 12 can than generate the array of target positions at each desired interval over the course of the wiping cycle.

As will be appreciated, the position of the wiper blades is controlled by regulating the motor current so as to keep the wiper blades at the target positions. The motor current, or torque, is also used as feedback information for other purposes, including: 1) over-current protection as discussed above; (2) determination of a reference position (e.g., par position) without the need for limit switches; and (3) determination of windshield conditions.

Automatic determination of a desired park position for the wiper blades can be accomplished as follows. First, the wipers are driven towards and then through the park position until they come into contact at the base of the windshield with a positive stop (such as the cowl cover) that acts as a known reference. This positive stop prevents further rotation of the wipers, thereby causing the motor current to rise relatively sharply. This condition is determined by examining torque signal and its first derivative so that it can be distinguished from torque changes due to other obstructions or due to the state of the windshield. When this condition is sensed, the current position of the wiper can be used as a reference for determining the absolute position of the wiper. The wiper can then be rotated away from the cowl cover by a small, preselected amount and this new position taken as the part position. The amount of rotation to the home position (if different from the part position) and to the other end of travel can be predetermined by testing and will depend upon such factors as the shape of the windshield glass, the length of the wiper blades, and the location of the wiper arms' centers of motion. Thus, the end positions and range of travel of the wiper blades can be set (and reset) without the need for limit switches or slip rings. Thus, fewer parts are required resulting in a decrease in the number of possible failure modes. This method of determining a desired park position can be carried out during vehicle assembly by the automobile manufacturer or could be programmed to occur in response to a preselected event, such as the ignition being switched on or a certain number of windshield wiper activations having occurred. Also, it will be appreciated that this same method of determining a desired park position can be utilized for many different windshields with only a minor software change.

The amount of torque supplied by the motors to move the wiper blades across the windshield depends upon the condition of the windshield. For example, more torque is required to operate the wipers when the windshield is dry than when it is wet. Thus, motor torque can be used in conjunction with the outside and/or inside air temperature, vehicle speed and, if desired, other operational parameters to determine the condition of the windshield. Once the condition of the windshield has been determined, the windshield wiper system, windshield washing system, and/or the vehicle's climate control system can be automatically activated as needed to clean the windshield. Also, the acceleration, deceleration, and velocity values can be calculated and/or updated as desired to accommodate different environmental circumstances. Rain sensors and other such additional sensors can be used in lieu of or in addition to the motor torque to provide controller 12 with data indicative of the condition of the windshield.

The position information provided by the tachometer signal can also be used for purposes other than controlling the wiper position. For example, activation of the wiper fluid spray can be coordinated with the wiper blade position. Thus, a single momentary push by the vehicle operator on a windshield washer switch could result in automatic timing of the washer switch could result in automatic timing of the washer spray to insure that fluid is applied to the windshield prior to wiping in both directions.

The software control of the wiper blades also provides the windshield wiper system with additional capabilities. For example, a count of the total number of wiping cycles can be maintained and this information used to predict wiper blade failure. A signal can be provided to the operator as a warning of an impending blade failure. Also, the wipers can be paused at each end of travel when in the intermittent mode, rather than only when in their home positions. This could be implemented simply by changing block <62> of FIG. 2 so that it checks whether the wiper blade is at either end of travel. This type of intermittent operation can be advantageous in light rain or mist situations where a single wipe across the windshield is sufficient to remove the obstruction and where an immediate return wipe across the dry windshield would result in smearing and/or noise. Also, this additional pause reduces the average current draw of the system.

Windshield Wiper Mechanical Assembly

The use of separate dc motors to provide independent control of the wiper blades eliminates the necessity of mechanical linkages between the two wiper blades. The illustrated windshield wiper mechanical assembly of the invention takes advantage of the available room between the two motors by providing an integrated windshield wiper system that includes not only the motors and associated circuitry, but also the washer fluid reservoir, pump, nozzles, and, if desired, the exterior trim cowl cover. These components are all connected together as a single, drop-in assembly that significantly reduces the amount of labor required to install the assembly within the vehicle.

Turning now to FIG. 7, a first embodiment of the mechanical assembly of the invention is shown and is designated generally as 100. The assembly includes a pair of motors 102, 102' that drive respective right angle gear boxes 104, 104' having output shafts 106, 106', respectively. Gear boxes 104, 104' are each attached to a respective mounting bracket 108, 108' that is used to secure assembly 100 to the vehicle. The assembly also includes a fluid reservoir 110 that is supported at each end by motors 102 and 102'. Reservoir 110 can be an injection molded component having unitary fingers at each end that define a recess into which the motor housings extend. In this way, reservoir 110 is supported and constrained from movement by motors 102 and 102'. The assembly further includes a fluid pump 112 and a pair of nozzles 114, 114' that are connected to reservoir 110. Fluid pump 112 can be located inside or outside of reservoir 110 and nozzles 114, 114' can extend into reservoir 110 or can be routed outside of reservoir 110 to pump 112.

If desired, rather than directly pumping washer fluid to nozzles 114, 114' using fluid pump 112, an air-over-water system can be used in which reservoir 112 is pressurized via a compressed air source (not shown) and solenoid or other type of valve (not shown) is used to permit pressurized fluid from reservoir 110 through nozzles 114, 114'. The compressed air source can be an air pump that is used in lieu of washer fluid pump 112. The nozzles can be connected to a common supply line the extends directly into the interior of reservoir 112 via the valve. Alternatively, the nozzles can simply be tubes that extend directly into reservoir 110. The electronic control system used to control motors 102, 102' can be coupled to a pressure sensor within reservoir 112 and can be used to control the supply of compressed air into the reservoir. The control system can also operate the valve to permit washing fluid to spray onto the windshield in response to activation by the vehicle operator of a corresponding control switch. Moreover, the pressure within the reservoir can be controlled in accordance with various operational parameters to provide a controlled amount and rate of spray. For example, at highway speeds the air moving quickly over the surface of the vehicle often results in much of the washer spray missing the windshield entirely and instead being carried over the roof of the vehicle. Therefore, at higher speeds the pressure within reservoir 112 can be reduced so as to reduce the pressure and resulting atomization of washer fluid leaving the nozzles. For this purpose, an electronically controlled valve can be used to selectively bleed air out of reservoir 112 and this valve can also be controlled by the windshield wiper electronic control system.

As can also be seen by reference to FIG. 8, drive shafts 106, 106' and nozzles 114, 114' both extend out through a cowl cover 116. This cowl cover can be an exterior trim piece that is separately connected to the vehicle such that the drive shafts and nozzles float within their respective apertures in the cowl cover. Alternatively, the cowl cover can be formed as a structural member that partially or entirely supports reservoir 110 and/or motors 102, 102'.

Other variations will become apparent. For example, motors 102, 102' and reservoir 110 could all be rigidly connected to a bracket that is used to attach assembly 100 to the vehicle. Alternatively, reservoir 110 could be rigidly mounted to the vehicle and could provide the necessary support for motors 102, 102'.

FIG. 9 depicts another embodiment of the mechanical assembly of the invention in which the fluid reservoir 120 also forms the motor housing of one or both of the motors 122, 122' (only one motor shown). In this embodiment, the stator 124 is press fit into a cavity 120a formed in the outer surface of reservoir 120. An electrical connector 126 is used to electrically connect the Hall effect sensors 127 and windings of motor 122 to the windshield wiper electronic control system 140. The rotor 128 extends out of motor 122 and into an integral gear box 130 which has a drive shaft 132 that extends through cowl cover 134. Also, as shown in FIG. 9, reservoir 120 can also provide a mounting surface 138 for control module 140. Also, in this embodiment, cowl cover 134 forms the cover of reservoir 120 and can include nozzles as unitary projections from its outer surface. In this way, cowl cover 134 is utilized not only as exterior trim, but also as an integral part of reservoir 120.

Reservoir 120 can be injection molded or, if appropriate, blow molded. A motor housing formed from, for example, metal can be made an integral part of reservoir 120 using insert molding or any other suitable manufacturing process. Alternatively, a separate motor housing can be press fit into cavity 120a after reservoir 120 has been molded. Reservoir 120 can include tabs or other suitable fastening arrangements for retaining the motor housing within cavity 120a.

Referring now to FIG. 10, an embodiment of the mechanical assembly is shown in which the washer fluid within the reservoir 150 is used as a heat sink for the heat generated by the power electronic devices 152 (e.g., the power transistors used for commutation of the motor windings). Reservoir 150 includes an integral bottom plate 154 and a plastic body 156 that are integrally joined about the perimeter of plate 154. Plate 154 can be aluminum or other thermally conductive material. It can be joined to plastic body 156 during using an insert molding process in which plate 154 is placed into the mold used to form body 156. The power electronic devices 152 are fastened to an aluminum plate 158 during assembly of the electronic control module. The power devices can be thermally coupled to aluminum plate 158 via a thermal adhesive or using fasteners and thermal grease between the power devices and aluminum plate. An electronic control module cover 160 can be used to environmentally isolate power devices 152 as well as other circuit components. It will be appreciated that, if desired, the features of the embodiments of both FIGS. 9 and 10 could be incorporated into a single wiper system.

If desired, the motors can also be thermally coupled to the washer fluid, e.g., by insert molding a metal motor housing as an integral part of the reservoir. In this regard, the shape of the reservoir may be designed so as to maximize the amount of heat transfer away from the motors and/or the power devices. The mechanical assembly can also be designed with the outlet(s) for the washer fluid (i.e., the inlets for either the nozzles or washer fluid pumps) located at a certain distance above the bottom of the reservoir so that there will always be a preselected minimum amount of washer fluid available for removing heat from the power devices and/or motors.

Aluminum plate 158 and bottom plate 154 can be electrically grounded so as to ground the washer fluid within reservoir 150. This helps reduce the total EMI radiated by the electrical components of the windshield wiper system. Also, the reservoir can be designed so as to substantially enclose some or all of the wiper system's electrical wiring to provide shielding from other radiated emissions.

The combination of independent motorized control of the wiper blades with use of the intervening space for an integrated reservoir and fluid spray system provides a single assembly that significantly simplifies installation into the vehicle. The assembly is simply bolted to the vehicle and a single electrical plug can be used to connect the assembly to the vehicle electrical system.

We claim:

1. In a windshield wiper system for a vehicle, the wiper system having a first electric motor, a second electric motor, a fluid reservoir, and a pump;

said first electric motor being operable to rotate a first drive shaft that is adapted to support a first wiper blade and said second electric motor being operable to rotate a second drive shaft that is adapted to support a second wiper blade, wherein said first motor and said first drive shaft are spaced from said second motor and second drive shaft by an intervening space; and said pump being coupled to said reservoir to pump windshield wiper fluid from said reservoir;

characterized in that said motors, fluid reservoir, and pump are connected together as a single assembly, wherein said assembly includes one or more mounting members that support said motors, fluid reservoir, and pump, and wherein said fluid reservoir is supported at a first end by said first motor and is supported at said second end by said second motor, with said reservoir being constrained in said intervening space between said motors.

2. A windshield wiper system as defined in claim 1, wherein said fluid reservoir includes first and second spaced recesses and wherein said first and second motors have housings that extend into said first and second recesses, respectively.

3. In a windshield wiper system for a vehicle, the wiper system having a first electric motor, a second electric motor, a fluid reservoir, and a pump;

said first electric motor being operable to rotate a first drive shaft that is adapted to support a first wiper blade and said second electric motor being operable to rotate a second drive shaft that is adapted to support a second wiper blade, wherein said first motor and said first drive shaft are spaced from said second motor and second drive shaft by an intervening space; and said pump being coupled to said reservoir to pump windshield wiper fluid from said reservoir;

characterized in that said motors, fluid reservoir, and pump are connected together as a single assembly, wherein said assembly includes one or more mounting members that support said motors, fluid reservoir, and pump, and wherein said fluid reservoir is supported at a first end by said first motor and is supported at said second end by said second motor, with said reservoir being constrained in said intervening space between said motors;

wherein said fluid reservoir includes first and second spaced recesses and wherein said first and second motors have housings that extend into said first and second recesses, respectively; and wherein said fluid reservoir comprises a molded housing and wherein said first and second recesses are defined by respective first and second sets of fingers that extend from said molded housing.

4. A windshield wiper system as defined in claim 1, wherein said first and second motors are coupled to their associated drive shafts by respective first and second gear boxes, wherein said one or more mounting members comprise a first mounting member secured to said first gear box and a second mounting member secured to said second gear box.

5. A windshield wiper system as defined in claim 4, wherein said fluid reservoir extends between and is supported by said first and second motors.

6. In a windshield wiper system for a vehicle, the wiper system having a first electric motor, a second electric motor, a fluid reservoir, and a pump;

said first electric motor being operable to rotate a first drive shaft that is adapted to support a first wiper blade and said second electric motor being operable to rotate a second drive shaft that is adapted to support a second wiper blade, wherein said fist motor and said first drive shaft are spaced from said second motor and second drive shaft by an intervening space; and said pump being coupled to said reservoir to pump windshield wiper fluid from said reservoir;

characterized in that said motors, fluid reservoir, and pump are connected together as a single assembly, wherein said assembly includes one or more mounting members that support said motors, fluid reservoir, and pump, and wherein said fluid reservoir includes first and second unitary portions that comprise housings for said first and second motors, respectively.

7. A windshield wiper system as defined in claim 6, wherein said first and second unitary portions define respective first and second recesses in an outre surface of said fluid reservoir.

8. In a windshield wiper system for a vehicle, the wiper system having a fist electric motor, a second electric motor, a fluid reservoir, and a pump;

said first electric motor being operable to rotate a first drive shaft that is adapted to support a first wiper blade and said second electric motor being operable to rotate a second drive shaft that is adapted to support a second wiper blade, wherein said first motor and said first drive shaft are spaced from said second motor and second drive shaft by an intervening space; and said pump being coupled to said reservoir to pump windshield wiper fluid from said reservoir;

characterized in that said motors, fluid reservoir, and pump are connected together as a single assembly, wherein said assembly includes one or more mounting members that support said motors, fluid reservoir, and pump, and wherein said fluid reservoir includes first and second unitary portions that comprise housings for said first and second motors, respectively; and wherein said first and second motors each include a metal housing thermally coupled to the interior of said fluid reservoir, whereby fluid within said reservoir acts as a heat sink to thereby remove heat from said motors.

9. In a windshield wiper system for a vehicle, the wiper system having a first electric motor, a second electric motor, a fluid reservoir, and a pump;

said first electric motor being operable to rotate a first drive shaft that is adapted to support a first wiper blade and said second electric motor being operable to rotate a second drive shaft that is adapted to support a second wiper blade, wherein said first motor and said first drive shaft are spaced from said second motor and second drive shaft by an intervening space; and said pump being coupled to said reservoir to pump windshield wiper fluid from said reservoir;

characterized in that said motors, fluid reservoir, and pump are connected together as a single assembly, wherein said assembly includes one or more mounting members that support said motors, fluid reservoir, and pump, with said fluid reservoir being attached to said one or more mounting members and wherein said fluid reservoir is located in said intervening space with said motors being supported thereof.

10. In a windshield wiper system for a vehicle, the wiper system having a first electric motor, a second electric motor, a control circuit, a fluid reservoir, and a pump;

said first electric motor being operable to rotate a first drive shaft that is adapted to support a first wiper blade and said second electric motor being operable to rotate a second drive shaft that is adapted to support a second wiper blade, wherein said first motor and said first drive shaft are spaced from said second motor and second drive shaft by an intervening space; and said pump being coupled to said reservoir to pump windshield wiper fluid from said reservoir;

characterized in that said motors, fluid reservoir, and pump are connected together as a single assembly, wherein said assembly includes one or more mounting members that support said motors, fluid reservoir, and pump, wherein said fluid reservoir includes at least one thermally conductive member that is thermally coupled to the interior of said fluid reservoir, and wherein said control circuit includes one or more power devices thermally coupled to said thermally conductive member, whereby fluid within said reservoir acts as a heat sink to thereby remove heat from said one or more power devices via said thermally conductive member.

11. A windshield wiper system as defined in claim 10, wherein said fluid reservoir comprises a molded housing having a metal plate thermally coupled to the interior of said reservoir and to said one or more power devices.

12. In a windshield wiper system for a vehicle, the wiper system having a first electric motor, a second electric motor, a fluid reservoir, and a pump;

said first electric motor being operable to rotate a first drive shaft that is adapted to support a first wiper blade and said second electric motor being operable to rotate a second drive shaft that is adapted to support a second wiper blade, wherein said fist motor and said first drive shaft are spaced from said second motor an second drive shaft by an intervening space; and said pump being coupled to said reservoir to pump windshield wiper fluid from said reservoir;

characterized in that said motors, fluid reservoir, and pump are connected together as a single assembly, wherein said assembly includes one or more mounting members that support said motors, fluid reservoir, and pump, and wherein said fluid reservoir includes a metal contact within a lower portion of the interior of said reservoir, said contact being electrically grounded whereby windshield washer fluid within said reservoir is electrically grounded to thereby reduce electromagnetic interference radiated by said motors.

13. In a windshield wiper system having a first motor, a second motor, and a control circuit having first and second outputs connected to said first and second motors, respectively, said first and second motors each including a brushless dc motor having an output shaft for providing rotation to an associated wiper blade and said first and second motors further including an encoder that provides pulses indicative of angular displacements of the encoder's associated motor, wherein said control circuit is operable to use said pulses for commutation of said brushless dc motors, characterized in that:

said control circuit being further operable to use said pulses to determine the position of at least one of the wiper blades, with said control circuit being operable to count at least certain ones of said pulses and to determine the position of the wiper blade based upon said count.

14. A windshield wiper system as defined in claim 13, wherein said encoder utilizes Hall effect sensors to generate said pulses.

15. A windshield wiper system as defined in claim 13, wherein said first and second motors each include a drive module that provides commutation of said motors using said pulses.

16. A windshield wiper system as defined in claim 13, wherein said control circuit provides commutation of said motors using said pulses.

17. A windshield wiper system as defined in claim 13, wherein, for each of said motors, said control circuit is operable to track the position of the motor's associated wiper blade by incrementing a counter for each pulse occurring as a result of rotation of the motor in one direction and decrementing the counter for each pulse occurring as a result of rotation of the motor in the other direction.

18. In a windshield wiper system having a first motor, a second motor, and a control circuit having first and second outputs connected to said first and second motors, respectively, said first and second motors each including an output shaft for providing rotation to an associated wiper blade and an encoder that provides pulses indicative of angular displacements of the encoder's associated motor, characterized in that said control circuit being operable to measure the magnitude of current flowing through at least one of said motors and to determine a park position for the wiper blades using said measured current.

19. In a windshield wiper system having a first motor, a second motor, and a control circuit having first and second outputs connected to said fist and second motors, respectively, said first and second motors each including an output shaft for providing rotation to an associated wiper blade, and said control circuit being operable to control the position of the wiper blades, characterized in that said control circuit being operable to determined a target position for each of the wiper blades based upon desired acceleration, velocity, and deceleration values.

20. A windshield wiper system as defined in claim 19, wherein said control circuit is operable to determine torque values for each motor based upon said acceleration, velocity, and deceleration values.

21. A windshield wiper system as defined in claim 20, wherein aid control circuit is operable to determine said acceleration, velocity, and deceleration values in accordance with a user-selected wiper speed setting.

22. A windshield wiper system as define din claim 19, wherein said control circuit has an input for receiving a signal indicative of a user-selected wiper speed setting, and wherein said control circuit is operable to minimize said acceleration and deceleration values while permitting the wiper blades to complete a wiping cycle in the time allotted by the user-selected speed setting and while maintaining positional synchronism between the wiper blades.

23. In a windshield wiper system having a first motor, a second motor, and a control circuit having first and second outputs connected to said first and second motors, respectively, said first and second motors each including an output shaft for providing rotation to an associated wiper blade, and said control circuit being operable measure the current used by said motors, characterized in that said control circuit is operable to determine an environmental condition of the windshield in accordance with the measured current and is operable to change at least one of its outputs based upon said determined environmental condition.

24. A windshield wiper system as defined in claim 23, wherein said control circuit is operable to determine the environment condition using the measured current and at least one other measured parameters.

25. In a windshield wiper system having a first motor, a second motor, and a control circuit having first and second outputs connected to said first and second motors, respectively, said first and second motors each including an output shaft for providing rotation to an associated wiper blade, and said control circuit being operable measure the current used by said motors, characterized in that said control circuit is operable to determine an environmental condition of the windshield in accordance with the measure current and is operable to change at least one of its outputs based upon said determined environmental condition;

wherein said control circuit is operable to determine the environment condition using the measured current and at least one other measured parameter; and wherein said other measured parameter is outside air temperature.

26. In a windshield washer system having a first motor, a second motor, a fluid reservoir, a pump, and a control circuit, said first and second motors each including an output shaft for providing rotation to an associated wiper blade, said control circuit being operable to control the spray of washer fluid onto the windshield, characterized in that said control circuit being operable to control the spray of washer fluid onto the windshield in accordance with at least one measured parameter, wherein said control circuit is operable to track the position of the wiper blades and to spray washer fluid onto the windshield in synchronism with the wiper blades.

27. In a windshield wiper system having a first motor, a second motor, and a control circuit having first and second outputs connected to said first and second motors, respectively, said first and second motors each including an output shaft for providing rotation to an associated wiper blade, wherein said motors are operable in an intermittent mode to reciprocate the wiper blades between an inboard and an outboard position, characterized in that said control circuit is operable in an intermittent mode in which said control circuit operates to pause said motors when the wiper blades reach both said inboard and outboard positions.

* * * * *

UNITED STATES PATENT AND TRADEMARK OFFICE
CERTIFICATE OF CORRECTION

PATENT NO. : 6,281,649 B1
DATED : August 28, 2001
INVENTOR(S) : Thomas J. Ouellette, William H. Prendergast and William E. Ziegler It is certified that error appears in the above-identified patent and that said Letters Patent is hereby corrected as shown below:

Column 1,
Lines 3 and 4, delete "This application claims Beneficial of Provisional application Ser. No. 60/034,269 filed Jan. 3, 1997."

Column 5,
Line 44, delete "vis" and insert therefore -- via --.
Line 46, delete "part" and insert therefore -- park --.

Column 6,
Line 25, delete "62" and insert therefore -- 63 --.

Column 10,
Line 4, delete "part" and insert therefore -- park --.
Lines 43 and 44, delete "could result in automatic timing of the washer switch".

Column 15,
Line 30, after "supported" insert therein -- by said fluid resevoir at opposite ends --.

Column 16,
Line 62, delete "aid" and insert therefore -- said --.
Line 65, delete "define din" and insert therefore -- defined in --.

Column 17,
Line 12, after "operable" insert therein -- to --.
Line 29, after "operable" insert therein -- to --.

Signed and Sealed this

Twenty-third Day of July, 2002

*Attest:*

JAMES E. ROGAN
*Attesting Officer*     *Director of the United States Patent and Trademark Office*